(12) United States Patent
Bellamy, III et al.

(10) Patent No.: US 8,495,243 B2
(45) Date of Patent: Jul. 23, 2013

(54) DYNAMIC AND RECURSIVE TRANSACTION GATEWAY SYSTEM AND METHOD

(76) Inventors: Samuel W. Bellamy, III, Bryn Mawr, PA (US); Christopher R. Kronenthal, Penn Valley, PA (US); Stephen M. Oberholtzer, King of Prussia, PA (US)

( * ) Notice: Subject to any disclaimer, the term of this patent is extended or adjusted under 35 U.S.C. 154(b) by 175 days.

(21) Appl. No.: 13/185,746

(22) Filed: Jul. 19, 2011

(65) Prior Publication Data

US 2011/0276717 A1 Nov. 10, 2011

Related U.S. Application Data

(60) Provisional application No. 61/365,734, filed on Jul. 19, 2010, provisional application No. 61/366,083, filed on Jul. 20, 2010, provisional application No. 61/366,090, filed on Jul. 20, 2010, provisional application No. 61/366,093, filed on Jul. 20, 2010, provisional application No. 61/366,100, filed on Jul. 20, 2010.

(51) Int. Cl.
*G06F 15/173* (2006.01)

(52) U.S. Cl.
USPC ............ 709/238; 709/202; 709/242; 370/401

(58) Field of Classification Search
USPC ........... 709/202–203, 238–242; 370/400–401
See application file for complete search history.

(56) References Cited

U.S. PATENT DOCUMENTS

| | | | |
|---|---|---|---|
| 5,931,917 A | 8/1999 | Nguyen et al. | |
| 5,978,840 A | 11/1999 | Nguyen et al. | |
| 5,983,208 A | 11/1999 | Haller et al. | |
| 6,072,870 A | 6/2000 | Nguyen et al. | |
| 6,230,201 B1 | 5/2001 | Guck et al. | |
| 6,304,915 B1 | 10/2001 | Nguyen et al. | |
| 6,373,950 B1 | 4/2002 | Rowney | |
| 7,058,611 B2 | 6/2006 | Kranzley et al. | |
| 7,526,563 B2 * | 4/2009 | Ingimundarson et al. | 370/401 |
| 7,566,002 B2 | 7/2009 | Love et al. | |
| 7,584,244 B2 * | 9/2009 | Forstadius | 709/203 |
| 7,924,854 B2 * | 4/2011 | Dixon et al. | 370/401 |
| 8,209,411 B2 * | 6/2012 | Forstadius | 709/203 |
| 2003/0009382 A1 | 1/2003 | D'Arbeloff et al. | |
| 2007/0091870 A1 * | 4/2007 | Hsu et al. | 370/401 |
| 2010/0017468 A1 * | 1/2010 | Forstadius | 709/203 |

* cited by examiner

*Primary Examiner* — Bharat N Barot

(57) ABSTRACT

A dynamic and recursive transaction gateway system and its method are disclosed. The dynamic and recursive transaction gateway system is designed to handle financial, medical, and other types of transactional information. The dynamic and recursive transaction gateway system provides intelligence for processing transactions in all phases of the system. The dynamic and recursive transaction gateway system is empowered by introducing the protocol of Level 4 Data which are supplementary data used by the decision-making engine in the system. The dynamic and recursive transaction gateway system has a capability of generating and processing tokenized data which includes tokens for predetermined numbers of transactions, tokens for predetermined periods of time, tokens for unlimited time, and chain-bound tokens shared across locations. The dynamic and recursive transaction gateway system provides a novel approach: recursive transaction processing. Through the recursive transaction processing, sub-transactions generated from an original transaction are recursively fed to the system. The sub-transactions are individually processed by the system and routed to different destination systems.

7 Claims, 4 Drawing Sheets

DYNAMIC AND RECURSIVE TRANSACTION GATEWAY SYSTEM AND METHOD

CROSS REFERENCE TO RELATED APPLICATIONS

This application claims benefit from U.S. Provisional Patent Application No. 61/365,734 filed on Jul. 19, 2010, and from U.S. Provisional Patent Applications Nos. 61/366,083, 61/366,090, 61/366,093, and 61/366,100 filed on Jul. 20, 2010. All the U.S. Provisional Patent Applications mentioned above are hereby incorporated by reference.

FIELD OF THE INVENTION

The present invention relates to transaction gateway systems and methods which are used to manage financial, medical, and other types of transactional information.

BACKGROUND OF THE INVENTION

Previous transaction gateway systems are considered linear in nature. In previous gateway systems, both a predetermined originating system and a predetermined destination system are either part of the interfaces to the transaction systems or encoded in transaction information itself. Although those previous transaction gateway systems use the transaction information to statically route a transaction and may appear dynamic with several inputs and outputs, they do not dynamically make decisions on how to process and route a transaction. In some previous systems, processes of deciding the best paths may be in place, but the final destination of a transaction is the same.

In U.S. Pat. Nos. 5,931,917, 5,978,840, 6,072,870, and 6,304,915 B1 (Nguyen et al., 1999, 1999, 2000, and 2001) disclose a payment gateway system. The payment gateway system receives, unwraps, and decrypts payment requests, converts transaction data to host-specific formats, and then forwards mapped requests to one host. U.S. Pat. No. 5,983,208 (Haller et al., 1999) discloses a method for communicating between a gateway and an existing host payment application. U.S. Pat. No. 6,373,950 B1 (Rowney, 2002) discloses a method for transferring electronic payment information from a first computer to a second computer. In the disclosure, a payment gateway system formats transaction information and transmits to a host legacy system. U.S. Pat. No. 7,058,611 B2 (Kranzley, et al., 2006) discloses a system including a payment gateway. The payment gateway performs authentication and sends transaction data back a message originator, and enables the message originator to use its existing payment system protocol for actual authorization. US Pat. Pub. No. 20030009382 A1 discloses a method using a merchant payment gateway server. In the method, an electronic payment request is directed to the payment gateway server, and the payment gateway server identifies and authenticates the request, and routes the request to an internal payment/loyalty program or to one of payment/loyalty networks. U.S. Pat. No. 6,230,201 B1 (Guck et al., 2001) discloses an electronic transaction gateway. The gateway establishes communications between a host system and trading partners. U.S. Pat. No. 7,566,002 B2 (Love et al., 2009) discloses an identification verification system which includes a transaction gateway. The transaction gateway receives a communication associated with identification verification, determines whether the communication includes a request to verify encoded data, routes the request to a service, receives a result of the service, and transmits the result to a requester. In all these disclosures, either originating systems or destinations of transactions are predetermined, transactions are statically routed to destinations. In general, these gateway systems or methods lack dynamic features.

SUMMARY OF THE INVENTION

The present invention discloses a dynamic and recursive transaction gateway system which is designed to handle financial, medical, and other types of transactional information.

The present invention provides intelligence for processing transactions in all phases of the dynamic and recursive transaction gateway system. The dynamic and recursive transaction gateway system applies a dynamically formed rule set to analyze contents of the transactions in real-time, and has a capability of changing the original intent and properties of the transactions, e.g., generating sub-transactions from an original transaction, changing original destinations of transactions. The dynamic and recursive transaction gateway system is empowered by introducing the protocol of Level 4 Data which are supplementary data used by the decision-making engine in the dynamic and recursive transaction gateway system. In previous gateway systems, the data passed in and used in financial transaction processing is relegated to the ISO specified track 1, 2, and 3 data, plus a few additional key data points surrounding an originating entity. However, the dynamic and recursive transaction gateway system uses an expanded full-scenario data set to make decisions on processing transactions.

The dynamic and recursive transaction gateway system provides a novel approach: Recursive Transaction Processing (RTP). After receiving an incoming transaction from an originating system, the RTP in the dynamic and recursive transaction gateway system analyzes the transaction information, spins off a plurality of sub-transactions, and feeds the sub-transactions recursively to the dynamic and recursive transaction gateway system. Then, the sub-transactions are individually analyzed by the dynamic and recursive transaction gateway system with the intelligence specific to each individual sub-transaction, and routed to a plurality of end-point or destination systems. Eventually, all the sub-transactions are coordinated back to the originating system with a universal transaction identification number, and then the recursive nature of the transaction process is finalized. The universal transaction identification number binds all the sub-transactions in the RTP. Thus, no matter how many subsequent sub-transactions are processed through the RTP, the RTP ensures that the integrity of the original transaction is preserved. The Recursive Transaction Processing is capable of being applied in a wide array of products and services, and servicing many industries and end-cases of transaction processing.

The dynamic and recursive transaction gateway system has a capability of generating and processing tokenized data which is used to replace sensitive data with nonsensitive data, e.g., to replace transaction identification numbers with unidentifiable data. The tokenized data is generated and encrypted by the dynamic and recursive transaction gateway system upon a request in an initial transaction of a customer from an originating system, and sent back to and stored in the originating system. In subsequent transactions, the tokenized data is retrieved and decrypted for further use. It is uniqueness that the tokenized data in the present invention is capable of being programmatically designed for (1) unlimited transactions without expiration, (2) predetermined numbers of transactions, (3) predetermined periods of time, and (4) chain-bound tokens shared across locations.

The dynamic and recursive transaction gateway system comprises a plurality of on ramps, a plurality of interchanges, and a plurality of off ramps. Incoming transaction data in various formats from originating systems are managed by the on ramps, and transformed into a common format used by the dynamic and recursive transaction gateway system. In the on ramps, the transaction data and originating system data are analyzed. Based on the analysis, the on ramps make decisions on how to process the the incoming transaction data. The originating system data includes configurations and parameters of the originating systems and devices used by the originating systems. The decisions are made based on the dynamically formed rule set. The harmonized transaction data in the common format are processed by the interchanges. Routing the transaction data to final destination (or end-point) systems are dynamically determined, and then the transaction data is transformed to secure formats for transmissions to the final destination systems. The transaction data is routed to the final destination systems through the off ramps. The off ramps receive responses from the destination systems, transform the transaction data back into the common format, and concludes by programmatically triggering appropriate ones of the on ramps to respond the originating systems.

Off ramps in the dynamic and recursive transaction gateway system manage transmission of the transaction data to destination (or end-point) systems. Each of the off ramps has a protocol translator and a dynamically loaded one of configurations. The dynamically loaded configuration is specifically for at least one of the destination systems. The configurations include information of the destination systems, e.g., IP addresses and modes. The configurations also includes all of localized semantics and functional interoperability constraints. When the transaction data is transmitted from the dynamic and recursive gateway system to the at lease one of destination (or end-point) systems, the protocol translator, the dynamically loaded configuration, and the at least one of destination (or end-point) systems are lined up. An important feature is segregation of the protocol translator and the configurations. The segregation puts the burden of transformation of configurations one layer abstracted from the destination systems, such that a single protocol translator can be shared by a plurality of configurations and thus by a plurality of destination (or end-point) systems. In the present invention, when a specific transaction is processed, only one of the configurations that is specifically for the at least one of the destination systems is dynamically called and loaded. This level of scalability allows rapid expansion of configurations in the gateway system for any transaction formats, especially for industrially standardized formats, e.g. ISO 8583 and HL7.

Each transaction entering the dynamic and recursive transaction gateway system is analyzed by a dynamic rule set. Due to the data-aware nature, the dynamic rule set allows a diverse range of applications of the dynamic and recursive transaction gateway system. And, the present invention can process transactions from any industry using any standards based and/or proprietary formats. Immediate uses of the dynamic and recursive transaction gateway system include acting as a gateway in the financial industry, which allows numerous and various payment systems and applications to communicate via transactions. The gateway system in the financial industry will support public and private label account cards, loyalty and promotion systems, as well as cashless and closed loop payment systems. Due to the flexibility of the architecture, the present invention supports numerous and various markets for the capture and compilation of business data from disparate systems at the point of transaction origination, including but not limited to electronic payment, inventory movement, loyalty, and promotions.

DETAILED DESCRIPTION OF EXEMPLARY EMBODIMENTS

Figure 1:
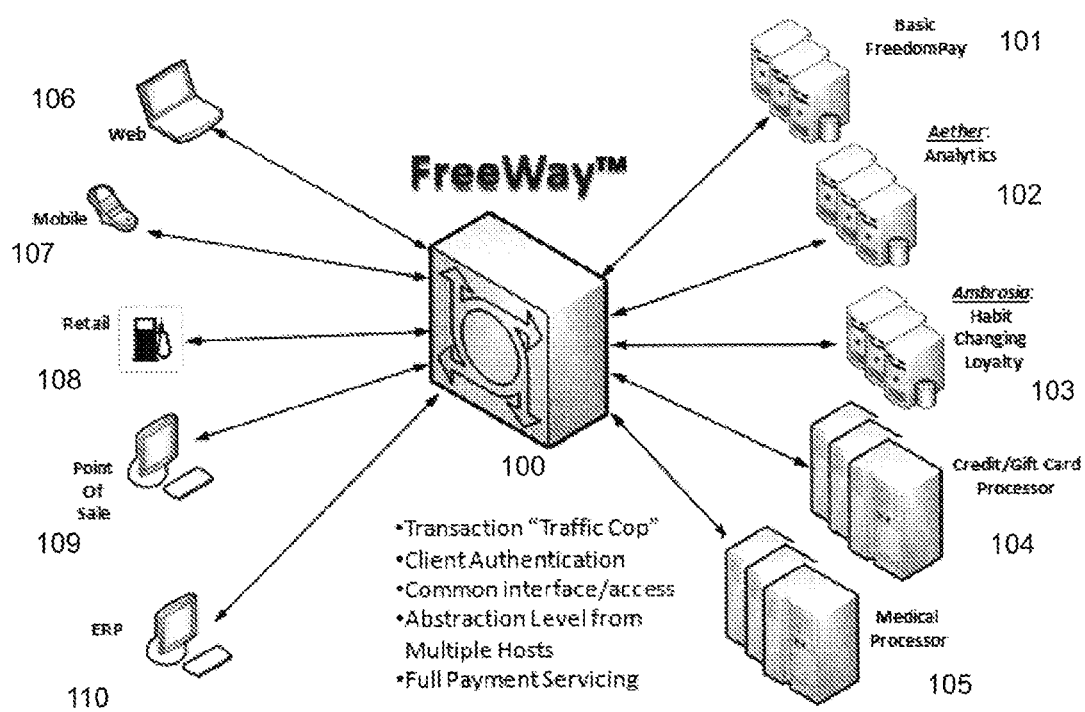
FIG. 1 is a schematic showing an exemplary system architecture of the dynamic and recursive transaction gateway system.

FIG. 1 illustrates an exemplary system architecture of FreeWay™. FreeWay™ 100 is an exemplary dynamic and recursive transaction gateway system. FreeWay™ 100 is an abstraction level from multiple hosts, and provides a common interface for clients. FreeWay™ 100 is capable of handling financial, medical, and other types of transactional information. The hosts include, but are not limited to, full payment services 101, analytics for solving problems in business and industry 102, loyalty programs 103, credit/gift card processors 104, and medical processors 105. FreeWay™ 100 provides a common interface for various clients, including Internet users 106, mobile communication users 107, retail stores 108, points of sale (POS) 109, and enterprise resource planning (ERP) systems 110.

Figure 2:
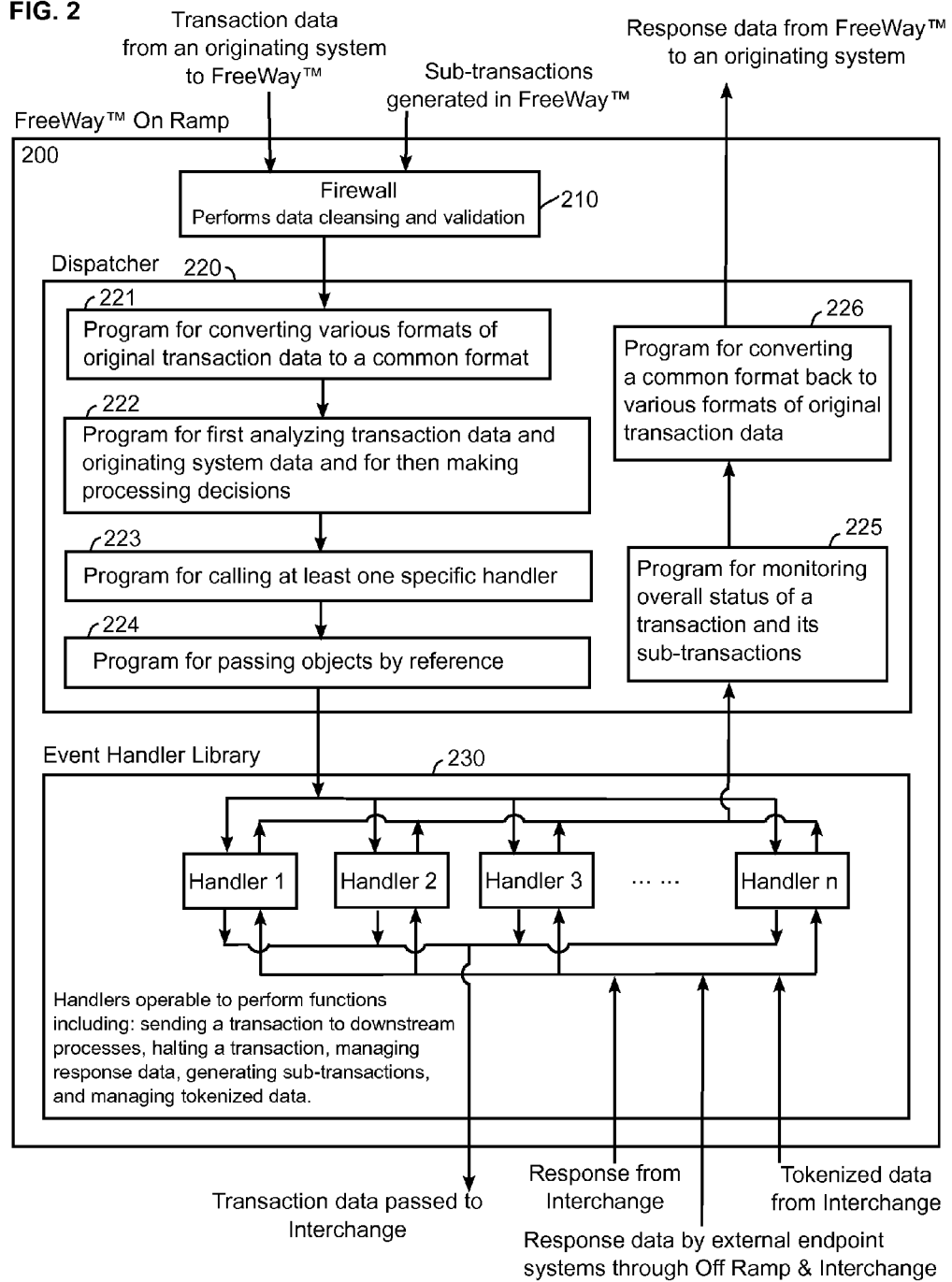
FIG. 2 is a diagram showing an exemplary on ramp in the dynamic and recursive transaction gateway system.

FreeWay™ comprises a plurality of on ramps, a plurality of interchanges, and a plurality of off ramps. FIG. 2 presents an exemplary on ramp in FreeWay™. The exemplary on ramp 200 comprises a firewall 210, a dispatcher 220, and an event handler library 230. Referring to FIG. 2, incoming transaction data from originating systems are validated by the firewall 210. The firewall 210 performs typical validation functionalities, such as required field and data typing checks. And, the firewall 210 also employs a unique solution that allows this existing validation practice to be employed on a basis of per-client and per-transaction-identifier (i.e. primary account number). One advantage is that this implementation in the firewall 210 allows a single interface to service many unique requirements insofar as data integrity and consistency are concerned. And, another advantage is that it allows validation rules to be updated and maintained without any code change to the FreeWay™ platform. All these advantages give extreme benefits to the quality of services in the environment of high volume transactions. External systems benefit greatly from this implementation because the firewall 210 provides them with a single interface for integration. The single interface supplies errors/feedback in a consistent state across an unlimited implementation of rules for validation and data integrity.

Referring to FIG. 2, a dispatcher 220 is part of the on ramp in FreeWay™. A first dispatcher program 221 in the dispatcher 220 is for converting various original data formats of the incoming transaction data to a common data format used by FreeWay™. A second dispatcher program 222 is for analyzing transaction data and originating system data and for then, based on rule settings, making processing decisions on how to process transaction the transaction data. The originating system data includes configurations and parameters of originating systems and devices used by originating systems.

The processing decisions include sending a transaction to downstream processes of FreeWay™, halting and rejecting a transaction, and halting a transaction and then generating sub-transactions. The second dispatcher program 222 controls which handlers are needed in processing the transaction data. A third dispatcher program 223 is operable to call at least one specific handler in event handler library 230. A fourth dispatcher program 224 is for sending a transaction to an interchange 300 shown in FIG. 3 by passing objects by reference. A fifth dispatcher program 225 is for monitoring overall status of a transaction and its sub-transactions. And, a sixth dispatcher program 226 is for converting the common data format to the original data formats.

Referring to FIG. 2, the event handler library 230 comprises a plurality of handlers. The handlers provide various functionalities, including sending a transaction to downstream processes, halting a transaction, handling a request for tokenized data, managing validation response data from an interchange, and managing end-point response data from an end-point system. One of the handlers in the event handler library 230 is specifically operable to generate sub-transactions from an original transaction and feed sub-transactions individually back to the firewall 210 of different on ramps. When the sub-transactions are generated and recursively fed to FreeWay™, the original transaction is halted by another one of the handlers in the event handler library 230. Through the jockeying of the handlers, the dispatcher 220 is capable of managing the order of operations for processing any incoming request in real-time and dynamically.

Figure 3:
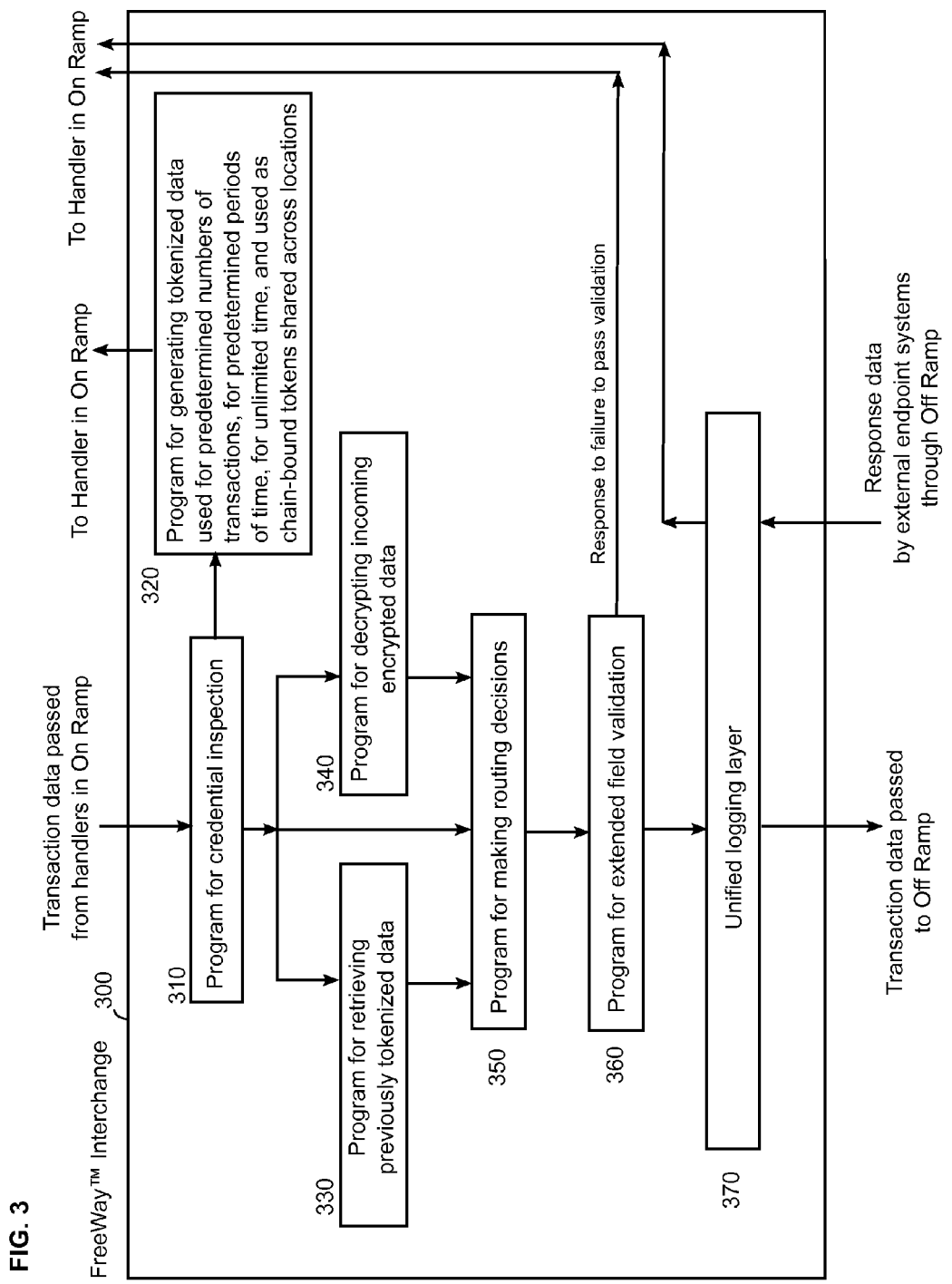
FIG. 3 is a diagram showing an exemplary interchange in the dynamic and recursive transaction gateway system.

FIG. 3 shows an exemplary interchange in the dynamic and recursive transaction gateway system. A first interchange program 310 in the interchange 300 is for credential inspection on originating systems. A second interchange program 320 is operable to generate tokenized data upon a request from an originating system and manage sending the generated tokenized data to the originating system. The tokenized data is used to replace sensitive data with nonsensitive data. The tokenized data includes tokens for unlimited transactions without expiration, tokens for predetermined numbers of transactions, tokens for predetermined periods of time, and chain-bound tokens shared across locations. A third interchange program 330 is operable to retrieve previously generated tokenized data in a transaction. A fourth interchange program 340 is operable to decrypt incoming encrypted data. A fifth interchange program 350 is operable to make a routing decision on sending a transaction to at least one of end-point systems. FreeWay™ dynamically routes transactions to their final destinations based upon a dynamic rule set. Previous gateway systems are relegated to back-end routing based on certain pre-defined identification numbers. However, the open-ended architecture of FreeWay™ facilitates rules based on regular expressions and pattern matching, thus allowing an unlimited set of rules to be applied for mapping direction. A sixth interchange program 360 is operable to conduct extended field validation for a transaction. And, a unified logging layer 370 ensures all transaction data to be logged in a consistent manner.

Referring to FIG. 3, the incoming transaction data passed from the on ramp is processed by the first interchange program 310, the second interchange program 320 if the originating system requests for the tokenized data, then the third interchange program 330 if the tokenized data is in the transaction data or the fourth interchange program 340 if the encrypted data is in the transaction data, and then the fifth interchange program 350. If neither the tokenized data nor encrypted data is in the transaction data, the transaction data passed from the on ramp is processed by the first interchange program 310, the second interchange program 320 if the originating system requests for the tokenized data, and the fifth interchange program 350. After the fifth interchange program 350, the transaction data is passed to the sixth interchange program 360 for the extended field validation. If the extended field validation of the transaction data fails, the validation response data will be sent to the originating system through the on ramp. After passing through the unified logging layer 370, the transaction data is route-ready with end-point systems flagged and sent to an off ramp in FreeWay™.

Figure 4:
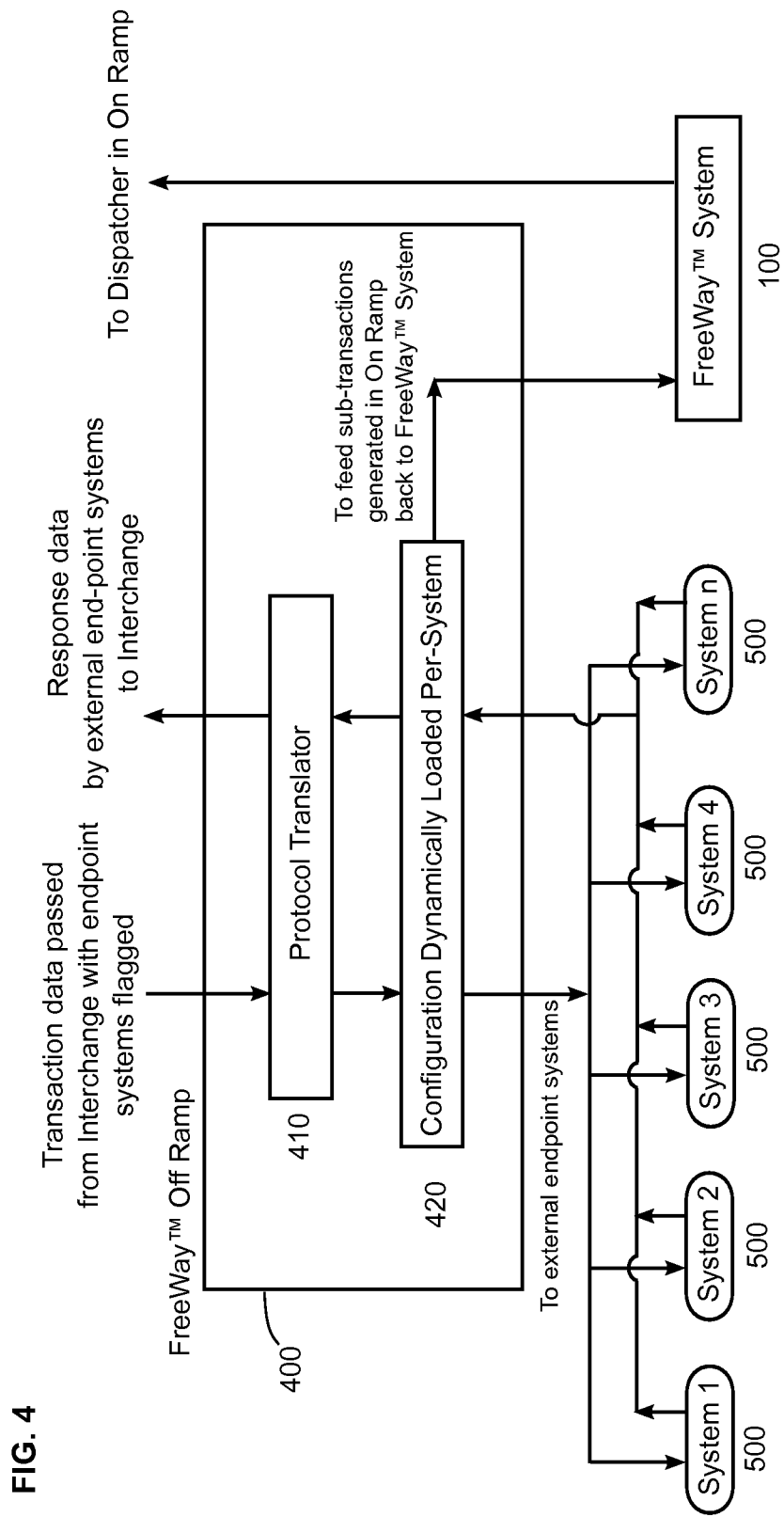
FIG. 4 is a diagram showing an exemplary off ramp in the dynamic and recursive transaction gateway system.

FIG. 4 illustrates an exemplary off ramp in FreeWay™. Referring to FIG. 4, the route-ready transaction data with end-point systems flagged is sent from the interchange to the off ramp. While the interchange manages the final decision on routing of the transaction, the off ramp facilitates the transaction leaving FreeWay™. The off ramp comprises a protocol translator 410 and a dynamically loaded configuration 420 specifically for at least one of the destination systems 500. The dynamically loaded configuration 420 is among a plurality of configurations. The configurations in the dynamic and recursive transaction gateway system comprise information of destination (or end-point) system 500, e.g. IP addresses and modes. The configurations also include localized semantics and functional interoperability constraints. When the transaction data is transmitted from Freeway™ to the at least one of destination (or end-point) systems 500, the protocol translator 410, the dynamically loaded configuration 420, and the at least one of the destination systems 500 are lined up. The single protocol translator 410 can be used by the plurality of the configurations and thus by a plurality of the destination (or end-point) systems. When the specific transaction is processed, only the configuration 420 that is specifically for the at least one of the destination systems is dynamically called and loaded.

Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. A dynamic and recursive transaction gateway system, which is used as a common interface between originating systems that initiate transactions and end-point systems that are destinations of said transactions, comprising:

a plurality of on ramps, a plurality of interchanges, and a plurality of off ramps;

each of said on ramps comprising a firewall for data cleansing and validation, a dispatcher for managing transaction data processing, an event handler library comprising a plurality of handlers;

said dispatcher comprising a first dispatcher program for converting original data formats used by said originating systems to a common data format used by said dynamic and recursive transaction gateway system, a second dispatcher program for first analyzing transaction data and originating system data and for then making processing decisions based on rule settings, a third dispatcher program for calling at least one of said handlers, a fourth dispatcher program for passing objects by reference to said interchanges, a fifth dispatcher program for monitoring status of said transactions and sub-transactions generated therefrom, and a sixth dispatcher program for converting said common data format to said original data formats;

said handlers operable to perform a plurality of functions which include sending said transaction data to downstream processes of said dynamic and recursive transaction gateway system, halting said transaction data processing, managing validation response data from said interchanges to said originating systems, and managing end-point response data from said end-point systems to said originating systems;

said handlers comprising a recursion handler operable to generate said sub-transactions from one of said transactions and feed said sub-transactions recursively to said dynamic and recursive transaction gateway system;

said handlers comprising a tokenization handler operable to forward requests for tokenized data by said originating systems to said interchanges and manage sending said tokenized data to said originating systems;

each of said interchanges comprising a first interchange program for inspecting credentials of said originating systems, a second interchange program for generating said tokenized data for said originating systems to replace sensitive data, a third interchange program for retrieving said tokenized data in said transactions, a fourth interchange program for decrypting encrypted data in said transactions, a fifth interchange program for making routing decisions, a sixth interchange program for conducting extended field validation of said transaction data, and a unified logging layer which ensures said transaction data to be logged in a consistent manner; and each of said off ramps comprising a protocol translator for translating between said common data format and end-point data formats used by said end-point systems and a dynamically loaded one of configurations, said dynamically loaded one specifically for at least one of said end-point systems, said configurations comprising interoperability constraints and end-point system data of said end-point systems and being in said dynamic and cursive transaction gateway system;

wherein said originating system data includes originating system configurations and parameters of said originating systems and devices thereof;

wherein said tokenized data includes first type tokens for predetermined numbers of said transactions, second type tokens for predetermined periods of time, third type tokens for unlimited time, and chain-bound tokens shared across locations;

wherein respective ones of said sub-transactions are processed by respective ones of said on ramps, respective ones of said interchanges, and respective ones of said off ramps; and wherein said validation response data or said end-point response data with respect to said respective ones of said sub-transactions is bound to a universal transaction identification number which has been used by said one of said transactions, and sent to a specific one of said originating systems that has initiated said one of said transactions.

2. The dynamic and recursive transaction gateway system of claim 1, wherein said one of said transactions is halted if said sub-transactions are generated and processed.

3. The dynamic and recursive transaction gateway system of claim 1, wherein a respective one of said requests for said tokenized data made by a respective one of said originating systems is passed through a respective one of said on ramps, and processed by said second interchange program, and said tokenized data is sent to said respective one of said originating systems through said tokenization handler, said fifth dispatcher program, and said sixth dispatcher program.

4. The dynamic and recursive transaction gateway system of claim 1, wherein a respective one of said transactions is processed through said firewall, said first dispatcher program, said second dispatcher program, said third dispatcher program, said fourth dispatcher program, said at least one of said handlers, said first interchange program, either said third interchange program or said fourth interchange program, said fifth interchange program, said sixth interchange program, said unified logging layer, said protocol translator, and said dynamically loaded one of said configurations, and routed to said at least one of said end-point systems.

5. The dynamic and recursive transaction gateway system of claim 1, wherein a respective one of said transactions is processed through said firewall, said first dispatcher program, said second dispatcher program, said third dispatcher program, said fourth dispatcher program, said at least one of said handlers, said first interchange program, said fifth interchange program, said sixth interchange program, said unified logging layer, said protocol translator, and said dynamically loaded one of said configurations, and routed to said at least one of said end-point systems.

6. The dynamic and recursive transaction gateway system of claim 1, wherein said end-point response data with respect to a respective one of said transactions initiated by a respective one of said originating systems is received from said at least one of said end-point systems, passed through said dynamically loaded one of said configurations, said protocol translator, said unified logging layer, said at least one of said handlers, said fifth dispatcher program, and said sixth dispatcher program, and sent to said respective one of said originating systems.

7. The dynamic and recursive transaction gateway system of claim 1, wherein said sixth interchange program generates said validation response data if said transaction data fails said extended field validation, and said validation response data is sent to a respective, one of said originating systems through said at least one of said handlers, said fifth dispatcher program, and said sixth dispatcher program.

* * * * *